May 12, 1959

H. S. HEMSTREET 2,885,792

GROUNDED AVIATION TRAINER FOR ROTARY WING AIRCRAFT

Filed March 31, 1954

May 12, 1959  H. S. HEMSTREET  2,885,792
GROUNDED AVIATION TRAINER FOR ROTARY WING AIRCRAFT
Filed March 31, 1954  6 Sheets-Sheet 3

H. S. HEMSTREET

2,885,792

GROUNDED AVIATION TRAINER FOR ROTARY WING AIRCRAFT

Filed March 31, 1954

United States Patent Office 2,885,792
Patented May 12, 1959

2,885,792
GROUNDED AVIATION TRAINER FOR ROTARY WING AIRCRAFT

Harold S. Hemstreet, Binghamton, N.Y., assignor to Link Aviation, Inc., Binghamton, N.Y., a corporation of New York Application March 31, 1954, Serial No. 419,954

15 Claims. (Cl. 35—12)

This invention relates to grounded aviation training apparatus, and more specifically to apparatus for creating a visual image of the scene viewed by the pilot of an actual aircraft for use in training students in the operation of an aircraft. The value of grounded training equipment bears a close relation to the realism obtained by the equipment, and of paramount importance in the instruction of students with grounded training apparatus are visual cues. While many instrument trainers are known in which adequate instruction in instrument flying and navigation may be given, certain flying maneuvers such as landings, takeoffs, and hovering are in actual practice conducted by "contact" flying, and it is desirable that a trainer be provided by which realistic visual simulation of these flying conditions may be produced. It has been found that accurate and realistic simulation of most of the conditions of contact flight may be produced by means of a projection apparatus automatically operable by manipulation of simulated aircraft controls to cast an image to be viewed by the student.

Because helicopters, autogyros, convertiplanes and other "rotary-wing" aircraft have come into wide use in recent years, it is desirable that training apparatus be provided for the instruction of students in the operation of such aircraft. In the training of helicopter pilots, much time is required for instruction in "hovering" and in maneuvering the aircraft slowly and positively about a fixed ground point, because "hovering" and slow movements of a helicopter or other rotary-wing aircraft have little similarity to any of the normal maneuvers of a conventional fixed wing aircraft.

It is therefore a primary object of the present invention to provide improved flight training apparatus for presenting a visual image of simulated flight conditions to a student-pilot.

It is an additional object of the invention to provide grounded training apparatus to simulate realistically the flight conditions of a "rotary-wing" type aircraft.

Other objects of the invention will in part be obvious and will in part appear hereinafter as the description proceeds. The invention accordingly comprises the features of construction, combination of elements, and arrangements of parts, which will be exemplified in the construction set forth, and the scope of the invention will be indicated in the claims.

It will become apparent that while I have illustrated my invention as applied to a typical modern helicopter, that various features and principles of the invention may be readily utilized by one skilled in the art in training apparatus designed to simulate operation of fixed wing aircraft. It will also become apparent that while I have illustrated my invention as applied to a particular type of rotary-wing aircraft, that various features and structures shown may be readily adapted by one skilled in the art to training apparatus designed to simulate other types of rotary-wing aircraft.

For a full understanding of the features, structures and principles of my invention, reference may be had to the accompanying drawings, in which.

Figures 1, 2, 3:
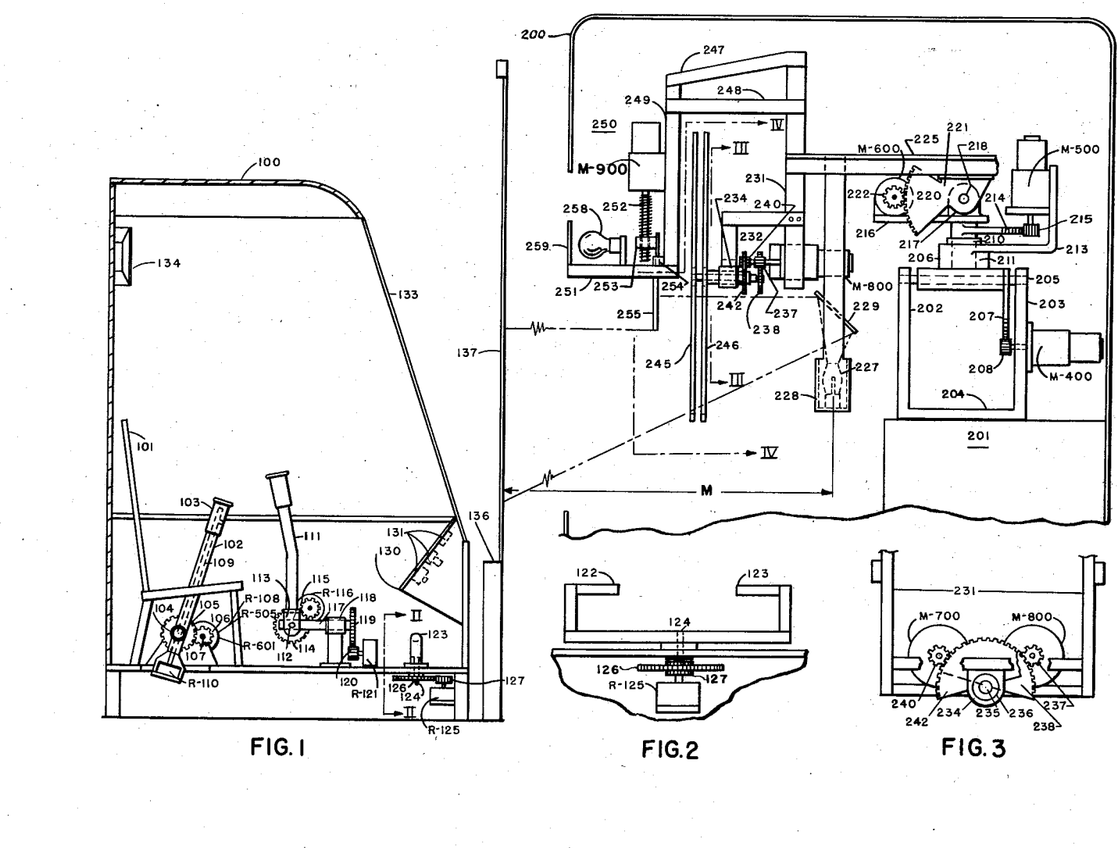
Fig. 1 shows a cross-section elevational view through the cockpit and projection apparatus of my invention.
Fig. 2 is a cross-section view taken through section II—II of Fig. 1, showing the simulated rudder-pedal assembly of the invention.
Fig. 3 is a cross-section view taken through section III—III of Fig. 1, showing the runway side shutter servomechanism portion of the invention.

Referring to Fig. 1 there are shown side elevation views, partly in cross-section, of the cockpit section and the projector section of the invention. Housing 100 comprises a mock-up of the cockpit of a conventional modern helicopter. A chair or seat 101 is provided for the student. Placed near the seat 101 are the various controls which are furnished in a typical modern helicopter, and a student seated at seat 101 is able to manipulate the controls in the same manner as in an actual helicopter. Situated to the left of the student as he sits in seat 101 are collective pitch and throttle controls 102 and 103 respectively. Collective pitch control 102 comprises a hollow rod suitably journaled in bearings (not shown) to rotate about shaft 104 as collective pitch control 102 is moved rearwardly or forwardly in relation to the helicopter, or to the left or right as viewed in Figure 1. Affixed to rod 102 is gear 105 which also rotates about shaft 104. Meshing with gear 105 is spur gear 106, which rotates about shaft 107, rotating the shaft of axially-mounted potentiometers R–108, R–601 and R–505 as the collective pitch control 102 is moved backward or forward.

Concentrically disposed within hollow rod 102 is shaft 109, to the upper end of which is fastened throttle grip 103. Rotation of throttle grip 103 is thusly transmitted through shaft 109 to rotate the wiper arm of potentiometer R–110. The terminals of potentiometers R–108, R–601 and R–505 and R–110 are connected by means of cables to other electrical circuits to be later described.

Situated forward of seat 101 is control stick 111. Affixed to the lower end of control stick 111 is clevis 113, through which passes shaft 112. The student is thusly enabled to manipulate control stick 111 forward and backward, thusly rotating spur gear 114, which is rigidly attached to clevis 113. Meshing with spur gear 114 is spur gear 115, which is coupled to the shaft of potentiometer R–116. Hence rearward or forward movement of control stick 111 serves to rotate the wiper arm of potentiometer R–116.

Shaft 112 passes at right angles through shaft 117, and hence sidewise movement of control stick 111 rotates shaft 117, which is journaled in bearing 118. Rotation of shaft 117 rotates spur gear 119. Meshing with spur gear 119 and coupled to the shaft of potentiometer R–121 is spur gear 120. Hence it will be seen that sidewise movement of control stick 111 serves to rotate the wiper arm of potentiometer R–121.

Situated forward of seat 101 and adapted to be operated by the feet of the student is the rudder pedal assembly, which may be better seen in Figure 2. By applying unequal forces to left rudder pedal 122 and right rudder pedal 123, the student is enabled to rotate shaft 124, which serves to rotate the shaft of potentiometer R–125 through spur gears 126 and 127.

Also provided within the cockpit mock-up is a simulated instrument panel 130, on which are provided simulated copies of the various instruments 131 which are present in the actual aircraft.

The simulated cockpit is provided with a clear glass windshield 133 similar to the windshield of the actual aircraft. Mounted near the top of the cockpit mock-up and not visible to a student seated in seat 101 is loud speaker 134. This loud speaker serves to provide sound effects to simulate sound occurring during operation of an actual aircraft.

Situated immediately in front of the trainer cockpit mock-up is a base 136 upon which is mounted translucent screen 137. Translucent screen 137 may be made of frosted glass or light cloth, for example, and images projected on translucent screen 137 by the projection apparatus to be described will be visible by the student as he views screen 137 through clear glass windshield 133.

Situated a distance ("M" as shown in Figure 1) is the projection apparatus portion of the invention. The distance M is usually greater than that shown in Fig. 1, and should be arranged as will be described below. The projection apparatus consists of a housing 200 in which the projector and computer apparatus is contained. Cabinet 201 houses servomechanisms and various electrical computer components to be later described. Mounted above computer cabinet 201 are columns 202 and 203, which are rigidly fastened to base 204 and which project upwardly. Supported between columns 202 and 203 and journalled therebetween is roll or bank shaft 205. Pivotally supported on roll shaft 205 is a tilting frame 206, which is free to rotate about the axis of roll shaft 205. Gear sector 207 is rigidly attached to frame 206. Meshing with gear sector 207 is pinion 208, which is rotated by angle of roll servo motor M–400. Servomotor M–400 is securely mounted on fixed column 203. Thus it will be seen that rotation of the shaft of servo motor M–400 serves to rotate frame 206 about roll shaft 205.

Journalled in frame 206 is bearing 210, in which is disposed vertical shaft 211. Frame 206 has a bracket portion 213 which extends rearwardly and upwardly and which serves as a mounting base for heading or turning servomotor M–500. Rigidly attached to vertical shaft 211 and extending rearwardly therefrom is gear sector 214. Pinion 215, which is driven by heading servomotor M–500, meshes with gear sector 214, and hence it may be seen that rotation of the shaft of heading servomotor M–500 serves to rotate shaft 211 and its associated apparatus about its vertical axis. Attached to the upper portion of vertical shaft 211 and rotatable therewith is a horizontally-disposed platform 216. Mounted atop platform 216 is a bearing block 217, in which is journalled pitching shaft 218. It will be apparent that separate bearings may be provided at each end of pitching shaft 218. Also mounted on the horizontally-disposed platform 216 is pitch servomotor M–600. Pitching shaft 218 carries pitching frame 221 in bearings (not shown). Integrally attached to pitching frame 221 is a gear sector 220, which meshes with pinion 222, the latter being rotated by pitch servomotor M–600. Rigidly attached to the upper portion of pitching frame 221 is a forwardly extending platform 225. Hence it may be seen that servomotors M–400, M–500 and M–600 serve to rotate platform 225 and all apparatus attached thereto about banking, turning and pitching axes. It will become apparent that while a specific mechanical arrangement allowing rotation about three axes has been illustrated, that numerous other apparatus of a similar nature, such as a universal joint, may be utilized in providing for movement of the projector platform portion of the invention about three perpendicular axes.

Extending downward from near the left end of platform 225 and movable therewith, is a light source assembly comprising lamp 227, reflector 228 and mirror 229. Light rays from lamp 227 are directed by reflector 228 toward mirror 229, from which the light is reflected toward translucent screen 137, to form a runway image thereon. Also mounted at the left end of platform 225 is a depending frame 231, which may be best seen in Fig. 3. Rigidly mounted on the lower portion of frame 231 are the left and right shutter servomotors M–700 and M–800. An angle bracket 232 attached to frame 231 (see Fig. 1) carries a bearing 234 in which is journalled a concentric shaft assembly comprising inner shaft 235 and outer shaft 236. Pinion 237 is driven by the shaft of servomotor M–800 and drives gear sector 238, rotating inner shaft 235. Pinion 240 is driven by servomotor M–700 and drives gear sector 242, rotating outer shaft 236. Connected to inner shaft 235 and rotatable therewith is right shutter 245. Connected to outer shaft 236 and rotatable therewith is left shutter 246. Right shutter 245 and left shutter 246 each consist of a large opaque plate having a cutout portion, and may be of the shape shown in Fig. 4a.

Also rigidly attached to platform 225 by means of brackets 247 and 248 and movable therewith is a runway end shutter assembly indicated generally at 250. Mounted on depending frame 249 is runway end shutter servomotor M–900, the shaft of which is coupled to vertical threaded shaft 252. Traveling nut 253 is mounted on threaded shaft 252 and also securely fastened to runway end shutter 255. Horizontal platform 251 is rigidly attached to depending frame 249, and carries a guide block 254, the latter serving to prevent rotation of runway end shutter 255. It will become apparent that as runway end shutter servomotor M–900 rotates, running traveling nut 253 up or down, runway end shutter 255 will be raised or lowered. Runway end shutter 255 consists of a rectangular opaque plate having a shape as shown in Figs. 4b–4e. Horizontal platform 251 also carries a sky light source 258 and a blued glass 259. Light rays emanating from source 258 pass through glass 259 and impinge upon translucent screen 137, casting a sky image upon screen 137. Miniature clouds may be drawn on glass 259.

Hence it may be seen that light patterns from source 227 and from source 258 are cast upon translucent screen 137, where they may be viewed by a student seated in seat 101. The shape and size of the pattern of light emanating from source 227 are determined by the positions of left shutter 246, right shutter 245, and runway end shutter 255. The positions of both of the patterns of light are determined by the position of the projector assembly, as determined by the positions of servomotors M–400, M–500 and M–600. For example, as pitch servomotor M–600 rotates, tilting platform 225 forward (left end down, as viewed in Fig. 1), the patterns of light projected upon translucent screen 137 will move downwardly on screen 137. Rotation of banking and turning servomotors M–400 and M–500 will cause similar rotation about the other two axes, tilting the patterns of light, or moving the patterns of light sidewise. By proper choice of the distance M, it will be seen that the sky image cast by light source 258 and the runway image cast by light source 227 may be positioned on screen 137 so that the lower boundary of the sky image terminates a short distance (for example, two inches) above the upper boundary of the runway image. This will create an image on screen 137 in which the runway image does not extend all the way out to the horizon. If the upper boundary of the runway image were to be coincident with the lower boundary (horizon) of the sky image, the scene viewed would appear to have an infinitely long runway.

Figure 4A:
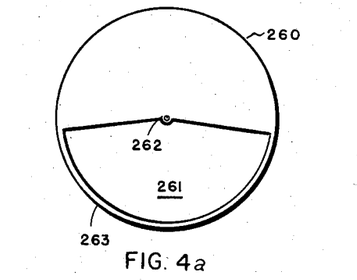
Figs. 4a, 4b, 4c, 4d and 4e show the image shutters of my invention, illustrating their respective positions for various simulated flight conditions.

Referring to Fig. 4a there is shown a detailed view of either left shutter 246 or right shutter 245, which are substantially identical. Each shutter consists of a large, circular sheet or plate of opaque material 260 having a cut-out portion 261. Located at the center of each shutter is an opening 262 by means of which the shutter may be securely affixed to its turning shaft. The shutters may be made of any opaque material having sufficient stiffness to retain their shape when supported as shown in Fig. 1. Shutters fabricated from 14 gauge aluminum sheet have been found to be suitable. If the shutters are made of material of sufficient rigidity, circular sectors may be utilized, since the stiffness added by band 263 will not be necessary. As was shown in Fig. 1, the centers of right shutter 245 and left shutter 246 are rigidly fastened to concentrically-disposed shafts 235 and 236, and are rotated by servomotors M–700 and M–800.

Figure 4B:
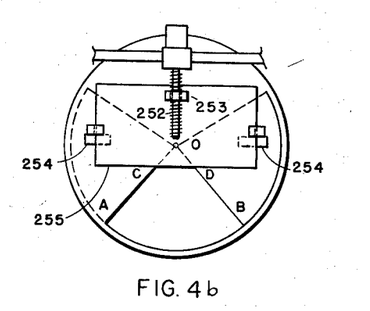
Figure 4C:
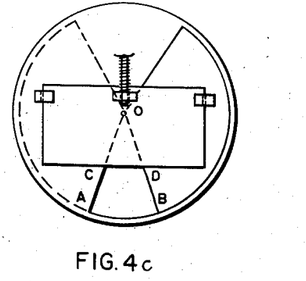
Figure 4D:
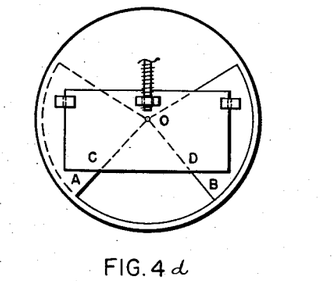
Figure 4E:
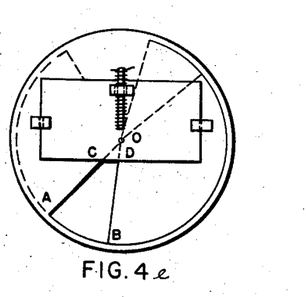

Figs. 4b, 4c and 4e illustrate several of the many various positions which shutters 245, 246 and 255 may take during operation of the apparatus of the invention. These figures are a view taken through section IV—IV of Fig. 1. In Fig. 4b there is shown runway end shutter 255, which is raised and lowered in guide blocks 254 by means of traveling nut 253 and threaded shaft 252. Mounted in back of runway end shutter 255 are left shutter 246 and right shutter 245. The cutout portions of the left and right shutters overlap, allowing light from light source 227 to pass through shutters 245 and 246 through an aperture defined in Fig. 4b as the area AOBA. A pattern of light having a shape AOBA is thusly cast toward translucent screen 137, but the upper portion of the pattern is blocked by opaque runway end shutter 255. The pattern of light which passes runway end shutter 255 and which is cast upon screen 137 will then have a shape ACDBA, as shown in Fig. 4b. As runway end shutter 255 is lowered, the pattern of light ACDBA will change, to assume a shape such as is shown in Fig. 4d. As left and right shutters 246 and 245 are rotated, the pattern of light may be narrowed or widened, as shown in Figs. 4c and 4d. The pattern of light ACDBA will thusly change shape and size as the shutter servomotors move shutters 245, 246 and 255. It will be apparent that if the distance between mirror 229 and the shutters is small compared to the distance between the shutters and screen 137, that the light pattern cast upon screen 137 will be much larger in area than the effective aperture ACDBA, though having the same relative shape.

If a pilot of a helicopter is hovering or moving over a long rectangular surface such as an aircraft carrier deck or an airfield runway, the shape of the carrier deck or the runway will be presented to him in perspective. The far end of the runway or carrier deck will appear to be narrower than closer portions, i.e., the actually parallel sides of the rectangular surface will appear to converge in the faraway distance. Referring to Fig. 4b, it may be seen that area ACDBA defines a pattern representative of a long rectangular surface as viewed in perspective by a viewer located above the surface at the center of the surface. Line AC and line DB would represent respectively the left and right sides of the runway or carrier deck, and line CD would represent the end of the carrier deck or the runway. As the pilot flew the helicopter forward, backward, sidewise, turned, pitched, banked, or gained or lost altitude, he would view the rectangular object below in different perspectives. In the invention, simulated flight of the aircraft in any of the above maneuvers causes the shape, size and/or position of the light pattern projected upon screen 137 to change. For example, the area ACDBA of Fig. 4e represents the perspective view of a pilot situated higher than a runway, but off to the right hand side of the runway. The pattern of light projected upon translucent screen 137 hence represents the simulated rectangular surface below the simulated aircraft, and by maneuvering the simulated aircraft controls in such manner as to project the desired perspective view upon translucent screen 137, a student may be trained to maneuver the simulated aircraft. Light source 258 will shine through blued lens 259, projecting a simulated blue sky on screen 137 immediately above the horizon line. The horizon line is determined by the lower boundary of the sky image cast through blued lens 259, and will be situated a small distance above the runway end image formed by shutter 255, even when the latter has been raised to its upper limit.

Each of the servomotors shown in Fig. 1 comprise a conventional small alternating current motor, an alternating current tachometer generator geared to the motor shaft, reduction gearing, and one or more potentiometers geared to be positioned by the motor shaft. Since such servomotor assemblies are well-known in the electrical arts and in the grounded trainer art, and because the specific details of such are not part of the invention, further description of their structure is deemed to be unnecessary. Electrical connections from each servomotor, generator, potentiometer and light source are made by means of cables (not shown) to the computer apparatus in cabinet 201.

*Engine speed simulation*

Figure 5:
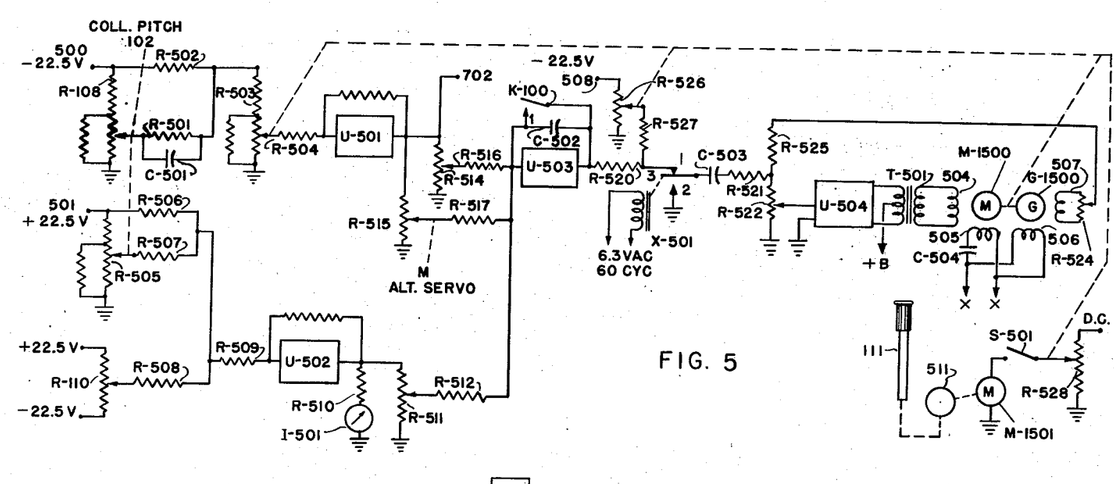
Fig. 5 is an electrical schematic diagram of the engine computer portion of my invention.

Referring to Fig. 5 there is shown a schematic diagram of the engine speed computer apparatus portion of the invention. Connected to terminal 500 is a direct voltage of 22.5 volts. It will be understood that while I may illustrate my invention using specified circuit values in certain parts, that numerous other values may be utilized in practicing the invention. It will be further understood that alternating current computation may be substituted for the direct current systems presently to be described. All voltages mentioned are given with reference to ground potential unless otherwise specified, as is conventional in the analogue computer and grounded trainer art. The negative direct voltage supplied from the trainer power supply is applied across potentiometer R–108. The winding of potentiometer R–108 is so arranged that the output voltage appearing upon the wiper arm of the potentiometer varies as the square of the displacement of the wiper arm. The wiper arm of potentiometer R–108 is positioned by the student by movement of collective pitch control 102, as is explained above in connection with Fig. 1. The voltage appearing on the wiper arm of potentiometer R–108 is applied through resistor R–501 and capacitor C–501 to excite potentiometer R–503. The purpose of capacitor C–501 is to pass rapid fluctuations of voltage from the arm of potentiometer R–108 to potentiometer R–503. A constant voltage from supply terminal 500 is also applied through resistor R–502, making the excitation of potentiometer R–503 commensurate with a constant factor plus the square of the displacement of collective pitch control 102. Potentiometer R–503 is similar to potentiometer R–108 in that its output voltage varies as a square function of its wiper arm displacement. The wiper arm of potentiometer R–503 is positioned by engine speed servomotor M–1500, as will be explained below, to a position representative of aircraft engine speed. The voltage on the arm of potentiometer R–503 is commensurate with $(k+\theta^2)N^2$, where $\theta$ equals collective pitch control displacement and N equals aircraft engine speed. This voltage is applied through resistor R–504 to drive a conventional direct current feedback amplifier U–501. The output of amplifier U–501 will be a negative voltage commensurate with the quantity $(k+\theta^2)N^2$.

A positive direct voltage is applied to terminal 501 from the trainer power supply, exciting potentiometer R–505, which also has a "squared" function. As is shown in Fig. 1, the arm of potentiometer R–505 is positioned by collective pitch control 102 in the same manner as potentiometer R–108. Hence it will be apparent that voltages commensurate with a constant ($k_2$) and $\theta^2$ are applied through resistors R–506 and R–507.

Potentiometer R–110, the wiper arm of which is positioned by throttle grip 103, is excited by positive and negative direct voltages, and hence a voltage having a polarity and amplitude dependent upon throttle grip position is applied thru resistor R–508. This voltage is added by means of parallel summing of currents in resistor R–509 to make the input voltage to feedback amplifier U–502 commensurate with the quantity:

$$k+\theta^2+\theta_g$$

where $\theta_g$ equals throttle grip displacement, which may be either a positive or negative quantity. The output voltage from amplifier U–502 is applied through resistor R–510 to operate manifold pressure indicator I–501, R–510 to operate manifold pressure indicator I–501, which may comprise an ordinary direct current milliammeter calibrated in terms of pressure, and which may be mounted on instrument panel 130. In the aircraft, manifold pressure and available engine torque are both very nearly proportional to the quantity:

$$k+\theta^2+\theta_g$$

The output voltage from amplifier U–502 is also applied to excite potentiometer R–511. The arm of potentiometer R–511 is adjusted to apply a voltage representative of available engine torque through summing resistor R–512 to integrator U–503.

The output of amplifier U–501 is applied to excite potentiometers R–514 and R–515. Hence a voltage proportional to the quantity $(k+\theta^2)N^2$ is applied through potentiometer R–514 and summing resistor R–516 to the input of integrator U–503. The output voltage from amplifier U–501 is also applied as excitation to potentiometer R–515, the wiper arm of which is positioned by the trainer altitude servo, M–1600 (see Fig. 6), and hence a voltage proportional to the quantity $(k+\theta^2)N^2z$ is applied to integrator U–503 through summing resistor R–517 (where z equals altitude). Because the amount of engine torque required to turn the helicopter main rotor varies primarily as the quantity $(k+\theta^2)N^2$, the voltage input through resistor R–516 is commensurate with the basic factors determining "torque required." Since the basic factors of "torque required" also affect aircraft heading, the voltage output from amplifier U–501 is supplied to terminal 702, for use in computing trainer heading, as is explained below in connection with Fig. 7. As a helicopter hovers near the ground or over any large solid surface, the torque required to turn the rotor varies slightly with altitude above the surface. This phenomenon is accounted for in the invention by the voltage input through resistor R–517, which depends upon altitude of the simulated flight. Thus it will be seen that the two positive inputs to integrator U–503 through resistors R–516 and R–517 add to represent an input commensurate with torque required to turn the main rotor.

The negative voltage input from amplifier U–502 and potentiometer R–511 is summed in conventional manner by parallel application through resistor R–512 and will therefore algebraically subtract from the positive inputs applied to integrator V–503. Since the input through resistor R–512 is proportional to torque available from the engine, and because the inputs of opposite polarity are proportional to torque required, their algebraic sum at the input to integrator U–503 will be proportional to the difference, which is the "net torque" which will accelerate or decelerate the simulated engine. Integrator U–503 receives the net torque input voltage and integrates it with respect to time, producing an output voltage proportional to engine speed. Capacitor C–502 is an integral part of integrator U–503, and the voltage developed across C–502 is the time integral of the net torque input voltage. Since such "Miller integrators" are well known in the art and because the specific details of the integrator form no part of the invention, a detailed description of the integrator is deemed to be unnecessary. Normally open contact 1 of reset relay K–100 functions to close and discharge capacitor C–502 when the instructor or student desires to "reset" the trainer and begin a new simulated flight. The operation of reset relay K–100 will be further explained below in connection with Fig. 10.

The output voltage from integrator U–503, commensurate with the net torque tending to accelerate or decelerate the simulated engine, is applied through resistor R–520 to the normally-closed contact 1 of a conventional chopper X–501. The operating coil of chopper X–501 is excited by a 60 cycle alternating voltage of constant frequency and serves to transfer the movable arm 3 between contacts 1 and 2 at a 60 cycle per second frequency. As will be apparent this applies pulses of direct voltage to capacitor C–503, resistor R–521 and potentiometer R–522. Since direct current will not pass through capacitor C–503, the D.C. level of the pulses will be lost, and 60 cycle alternating voltage will appear across resistor R–521 and potentiometer R–522. The wiper arm voltage of potentiometer R–522 is applied to a conventional alternating current servoamplifier U–504. The output voltage from servoamplifier U–504 is applied to the primary winding of output transformer T–501, the centertap of which is connected to a source of anode voltage (+B) for servoamplifier U–504, as is conventional in the electrical arts. The secondary winding of output transformer T–501 is connected to one exciting winding 504 of a typical two-phase alternating current induction motor M–1500. The quadrature winding 505 of motor M–1500 is excited from a suitable 60 cycle alternating voltage supply (X—X) through capacitor C–504, which serves to shift the phase of the voltage in the winding by approximately 90 degrees. The exciting voltages for chopper X–501 and the motor quadrature winding may be furnished from a common alternating current source.

The alternating voltage from supply source X—X is also utilized to excite the excitation winding 506 of tachometer generator G–1500. The shaft of tachometer generator G–1500 is directly connected to the shaft of motor M–1500, and hence the output voltage across winding 507 of tachometer generator G–1500 is proportional to the speed of rotation of servomotor M–1500. This output voltage is adjusted in amplitude by potentiometer R–524 and applied to the servomotor input via summing resistor R–525. Generator G–1500 thusly provides in well-known manner a rate feedback, which serves to stabilize operation of the position servo and serves to eliminate "hunting" about a null position. The shaft of motor M–1500 drives (through reduction gearing, not shown) the wiper arms of potentiometer R–526 and potentiometer R–523. Potentiometer R–526 is excited by a constant negative direct voltage applied to terminal 508 from the trainer power supply, and hence a voltage commensurate with the position of the shaft of motor M–1500 is applied to the servomotor input through summing resistor R–527. Thus it will be seen that potentiometer R–526 comprises a conventional "follow-up" potentiometer. As positive signals representative of engine speed are applied through resistor R–520, servomotor M–1500 will rotate until potentiometer R–526 supplies (through resistor R–527) a negative voltage just sufficient to cancel out the positive signal. Hence it will be seen that the position of the shaft of motor M-1500 will be a measure of simulated engine speed.

As engine speed increases in an actual aircraft, the control stick of the aircraft will vibrate at an increasing rate. In order to simulate this phenomenon, a small direct current motor M-1501 is mounted on control stick 111. Mounted on the shaft of motor M-1501 is an eccentric weight 511. As engine speed servomotor M-1500 varies the position of the arm of potentiometer R-528, the voltage applied to vibrator motor M-1501 is varied, causing its speed to change in relation to simulated engine speed. As will be apparent the speed of rotation of vibrator motor M-1501 and eccentric weight 511 will determine the nature of the vibrations imparted to control stick 111. A switch S-501 is provided by means of which the instructor may eliminate stick vibration.

*Altitude computation and simulation*

Figure 6:
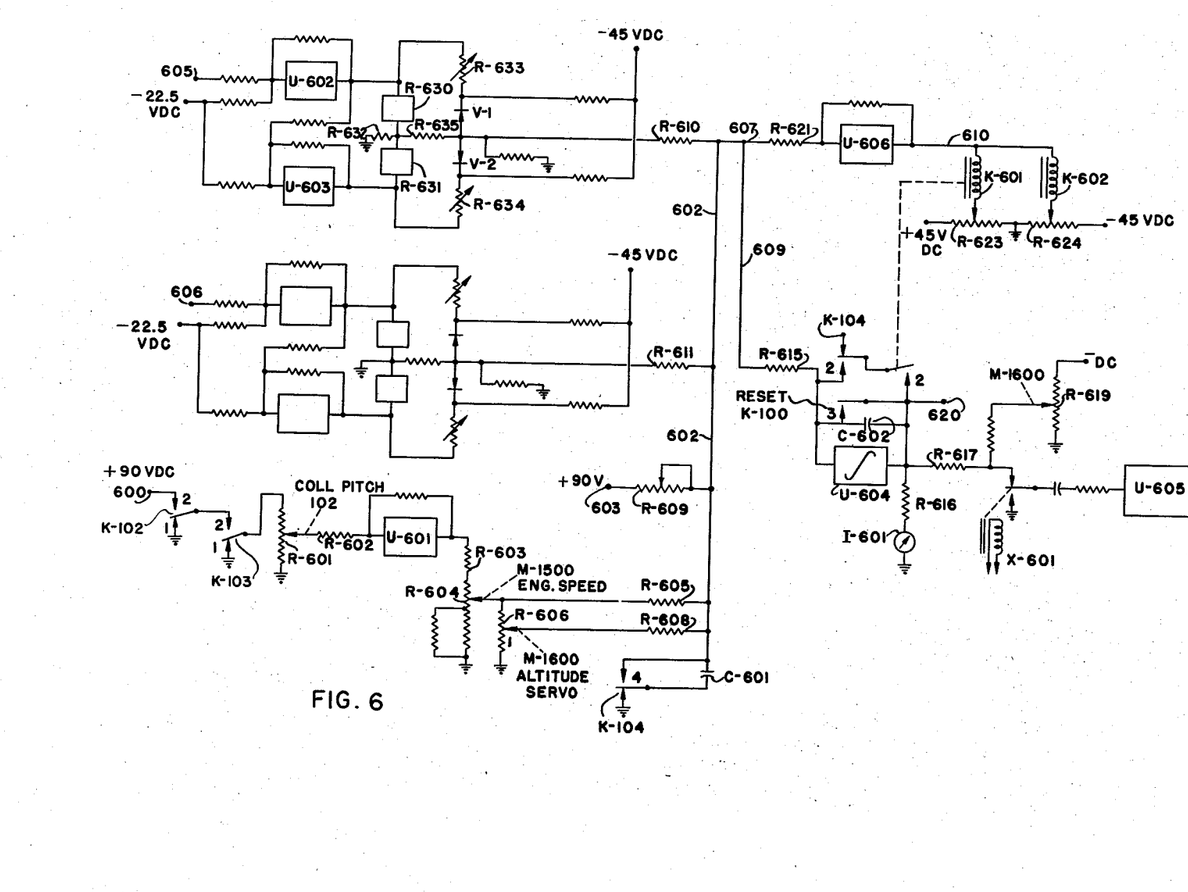
Fig. 6 is an electrical schematic diagram of the altitude computer portion of the invention.

Referring to Fig. 6 there is shown a schematic diagram of the altitude computation system of the invention. A direct voltage is supplied to terminal 600 from the trainer power supply. When engine speed of the simulated aircraft exceeds a designated amount (for example, 2750 r.p.m.), a cam attached to the shaft of engine speed servo M-1500 will close a switch (S-101 in Fig. 10) closing contact 2 of relay K-102. When simulated engine speed reaches a greater amount (for example, 3150 r.p.m.), another cam on the engine speed servo shaft will close switch S-102 (Fig. 10), closing contact 2 of relay K-103, applying the direct voltage at terminal 600 to excite potentiometer R-601, the wiper arm of which is positioned by the student's manipulation of collective pitch control 102, as explained in connection with Fig. 1. A voltage proportional to collective pitch is thusly applied through resistor R-602 to drive feedback amplifier U-601. The negative output voltage from amplifier U-601 is applied through resistor R-603 to excite potentiometer R-604. The voltage on the wiper arm of potentiometer R-604 is proportional to the square of the displacement of the arm, which is positioned by engine speed servomotor M-1500 (see Fig. 5). Thus the output voltage on the wiper arm of potentiometer R-604 is commensurate with the quantity $\theta N^2$. A portion of this voltage is applied to conductor 602 through summing resistor R-605. The voltage is also used to excite potentiometer R-606, the wiper arm of which is positioned by the trainer altitude servomotor M-1600, as will be explained below. A voltage proportional to $\theta N^2 z$ is thusly applied to conductor 602 through summing resistor R-608. Because the lift imparted to the actual aircraft is commensurate with $\theta N^2$, the voltage applied to conductor 602 through resistor R-605 is a basic measure of the lift of the simulated flight. When the aircraft hovers only slightly above any large surface such as the earth or a carrier deck, an increased lift is obtained due to compression of the air between the aircraft main rotor and the surface. This phenomenon is accounted for by the voltage input through summing resistor R-608. The arm of potentiometer R-606 is driven downwardly (as viewed in Fig. 6) for increasing altitude, decreasing the amount of added lift due to hovering near the ground. Hence it will be seen that the two negative voltages applied to conductor 602 through resistors R-605 and R-608 are measures of the lift forces tending to raise the aircraft upwardly.

Applied to terminal 603 from the trainer power supply is a direct voltage. This voltage is applied through potentiometer R-609 to conductor 602, and because it is of opposite polarity to the aforementioned lift voltages, it represents a down force, or gravity. The resistance of resistor R-609 is selected according to the weight of the aircraft, so that a greater resistance is used for a lighter aircraft. By adjusting the wiper arm of potentiometer R-609, the instructor is thusly enabled to simulate a loaded or unloaded aircraft.

Figure 8:
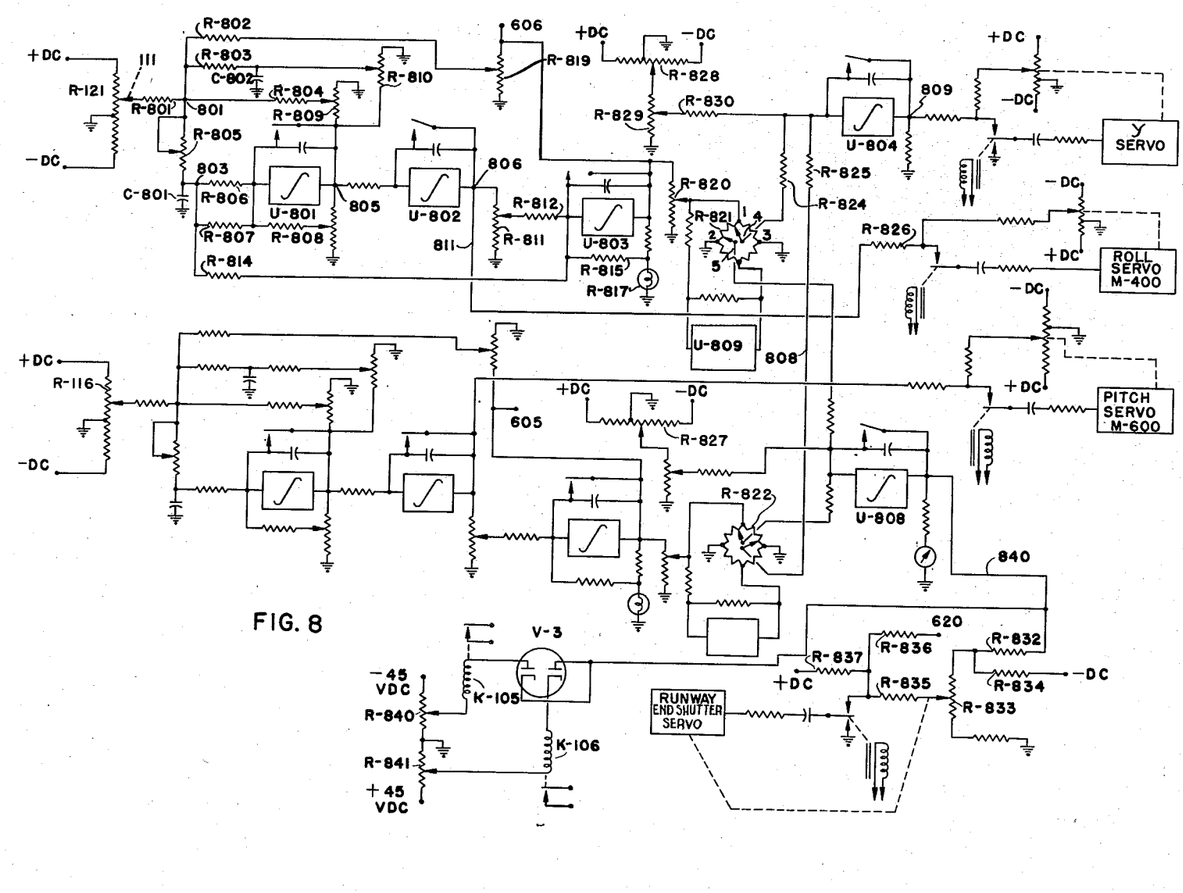
Fig. 8 is an electrical schematic diagram showing the attitude and position computer portions of the invention.

Whenever an actual aircraft of the type simulated has a sidewise or forward velocity, additional vertical forces are applied, causing increased or decreased lift. Voltages proportional to increased components of lift due to forward velocity and increased components of lift due to sidewise velocity are applied to conductor 602 through summing resistors R-610 and R-611, respectively. Since the computing networks for calculating the components of lift are identical, only the computation of increased lift due to forward velocity will be set forth in detail. It will be understood that "forward" velocity refers to motion either forward or backward. A direct voltage proportional to forward velocity ($\dot{x}$) which is derived as explained in connection with Fig. 8 is applied to terminal 605.

Figure 11:
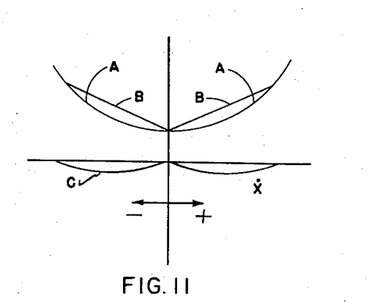
Fig. 11 is a graph useful in understanding operation of my invention in deriving potentials commensurate with simulated lift due to simulated aircraft translational velocity.

This voltage may be either positive or negative depending upon the direction of longitudinal movement, and its magnitude will be dependent upon speed of longitudinal movement. Assuming that the voltage is positive, a negative voltage will appear at the output of feedback amplifier U-602, and this voltage is used to drive feedback amplifier U-603. The output voltage of feedback amplifier U-603 will be positive. The output voltages from the two feedback amplifiers are equal in magnitude and proportional to longitudinal velocity, but opposite in polarity. These voltages are applied across two identical thyrite resistors R-630 and R-631. Since the resistance of thyrite varies inversely with the voltage applied across it, the voltage drop across the thyrite resistor will vary according to a power function of the voltage applied to it. Hence if the longitudinal velocity $\dot{x}$ voltage applied at terminal 605 varies according to the abscissae of Fig. 11, the voltage across resistor 632 will vary according to curve A of Fig. 11.

The output voltages from amplifiers U-602 and U-603 are also applied to rectifiers V-1 and V-2 through potentiometers R-633 and R-634. Since the rectifiers are oppositely-poled, only one will conduct for an input voltage at terminal 605 of a given polarity. If the polarity is reversed, the other rectifier will conduct. The current at the midpoint between the rectifiers will hence vary according to curve B of Fig. 11, and the voltage drop across resistor R-635 will also vary according to curve B. Since the voltages across resistors R-632 and R-635 are of opposite polarity, the voltage applied to resistor R-610 will be equal to the difference between the curves, and will hence vary with variation in longitudinal velocity in a manner shown in curve C of Fig. 11. The curve C of Fig. 11 approximates the variation in lift caused by longitudinal velocity.

The component of lift due to sidewise velocity which is applied to conductor 602 thru resistor R-611 is computed in an identical manner by application of a voltage proportional to sidewise velocity to terminal 606. This latter voltage is derived as explained in connection with Fig. 8.

Hence it will be seen that the sum of the lift voltages applied through resistors R-605, R-608, R-610 and R-611, and the gravity voltage applied through potentiometer R-609 will algebraically add to produce a voltage at terminal 607 which is a measure of the total of vertical forces on the simulated aircraft. This vertical force voltage is applied from conductor 602 to charge capacitor C-601. The resistances of R-610, R-611, R-609, R-605 and R-608 together with capacitor C-606 comprise a conventional integrating RC circuit. Positive voltages applied through any of the resistances increase the charge across capacitor C-601, and negative voltages decrease the charge across capacitor C-601. At any instant, the voltage across the capacitor will represent the time integral of the voltages applied through the resistances. Since the applied voltages represent vertical forces, their time integral will represent vertical velocity and the voltage between conductor 602 and ground will be a measure of the vertical velocity of the simulated aircraft. This voltage is applied through conductor 609 and resistor R-615 to the input circuit of integrator U-604, which may be of the same type as integrator U-503, described above in connection with Fig. 5. The output voltage from integrator U-604 is applied through resistor R-616 to operate altimeter I-601, which may comprise an ordinary direct current milliammeter calibrated in terms of feet. Whenever the trainer is "reset" by the instructor or student, or whenever the altitude of the simulated flight is less than zero, contact 5 of relay K-104 will be closed, preventing any further integration of vertical forces. This prevents simulation of an impossibility, i.e., downward vertical velocity when the simulated aircraft is on the ground or on a carrier deck. The altitude voltage output from integrator U-604 is also applied to terminal 620 for use in positioning the runway end shutter servo assembly, as will be explained below.

The output voltage from integrator U-604 is also applied through resistor R-617 to the input of an altitude servo assembly. The altitude servo assembly may be identical to the engine speed servo assembly described in connection with Fig. 5. Chopper X-601 converts the direct voltage into an alternating voltage to drive servo-amplifier U-605, the output of which will rotate altitude servomotor M-1600 (not shown) to a null position. Potentiometer R-619 is the follow-up potentiometer and its arm is positioned by servomotor M-1600. The voltage proportional to vertical velocity which appears on conductor 602 and terminal 607 is also fed through resistor R-621 and feedback amplifier U-606 to appear on conductor 610 at the upper terminals of relays K-601 and K-602. The arm of potentiometer R-623 selects a portion of the positive voltage applied across the potentiometer and applies it to relay K-601. As the voltage at terminal 607 becomes less negative (indicative of decreased upward velocity) the voltage on conductor 610 becomes increasingly negative, increasing the voltage across the coil of relay K-601. By adjustment of potentiometer R-623, relay K-601 is caused to be operated when upward velocity decreases to zero, closing its normally open contact 2. Hence contact 2 of relay K-601 will be closed whenever the velocity of the simulated flight is downward. If the aircraft is at a simulated altitude of zero (grounded) at any time during which contact 2 of relay K-601 is closed, contact 2 of relay K-104 will also be closed, short-circuiting the capacitor C-602 of integrator U-604, preventing the capacitor from integrating "minus altitudes." Operation of "reset" relay K-100 (Fig. 10) by the instructor or student will close contact 3 of reset relay K-100, which will also short-circuit and discharge the capacitor C-602 of integrator U-604.

Since a positive voltage proportional to rate of descent appears on conductor 610, the voltage across the operating coil of relay K-602 will increase with increasing rates of descent of the simulated flight. By adjustment of potentiometer R-624 the rate of descent at which relay K-602 will operate may be selected. Since a vertical descent at too great a speeed is dangerous, potentiometer R-624 is adjusted so that relay K-602 will be energized if the student manipulates the controls so as to cause a prohibitive rate of descent. Energization of relay K-602 serves to operate contacts which will energize circuits later described in connection with Fig. 10 to indicate that the student has exceeded the permissible descending speed, and the trainer will be reset, ending the practice flight. It will be apparent that contacts may be provided on relay K-602 to energize any suitable indicator when descending speed becomes too great.

Heading computation

Figure 7:
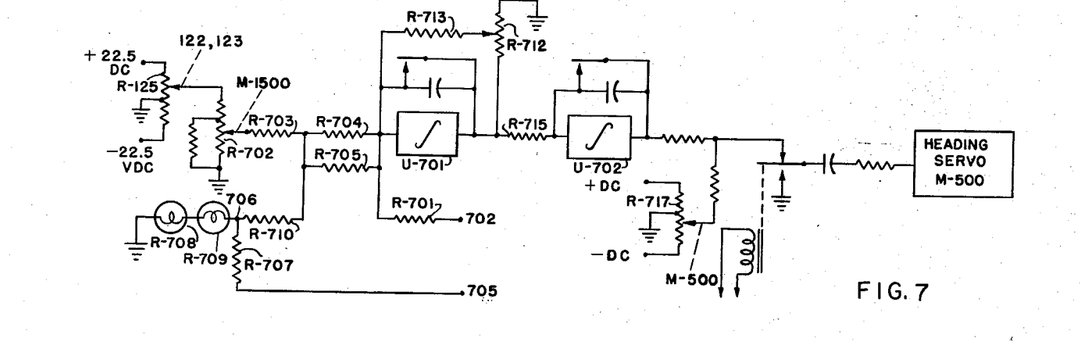
Fig. 7 is an electrical schematic diagram of the heading computer portion of my invention.

Shown in Fig. 7 is a schematic diagram of the electrical circuits utilized in computing heading of the simulated flight. A voltage commensurate with torque required to turn the main rotor is derived as explained in connection with Fig. 5 and furnished to terminal 702. It will be apparent that as the actual aircraft hovers in space, the torque tending to rotate the main rotor blades will cause equal and opposite reactionary forces tending to rotate the aircraft frame in an opposite direction, and hence tending to change aircraft heading. The voltage on terminal 702 is applied through summing resistor R-701 as one input to integrator U-701.

The actual aircraft has a small tail rotor which rotates in a vertical plane (assuming the aircraft is not banked) and which is used to steer the aircraft. The small tail rotor is driven through suitable gearing by the same engine as the main rotor of the aircraft, and aircraft turning may be accomplished by varying the pitch of the blades of the tail rotor. As the student applies unequal forces to rudder pedals 122 and 123 (see Fig. 3), he varies the position of the wiper arm of potentiometer R-125, just as the pilot of an actual aircraft varies the pitch of the tail rotor blades. Since opposite ends of potentiometer R-125 are excited with voltages of opposite polarity, the voltage on the arm of potentiometer R-125 may be positive or negative. This voltage, which may be referred to as $\theta_t$ (tail rotor pitch) is applied as excitation to potentiometer R-702, a "squared" potentiometer, the wiper arm of which is positioned by trainer engine speed servomotor M-1500. It will be apparent, therefore, that the voltage on the wiper arm of potentiometer R-702 will be a measure of the quantity $\theta_t N^2$. This voltage is applied through resistor R-703, the resistance of which is chosen with the "lever arm" of the tail rotor in mind. Hence the greater the distance between the tail rotor and the center of gravity of the aircraft, the less will be the resistance of resistor R-703, since the tail rotor pitch and speed will apply a greater turning moment to the aircraft. The voltage is then applied through summing resistors R-704, and R-705 to the input circuit of integrator U-701.

In an actual aircraft sidewise velocity produces a turning moment known as "weathercocking." To simulate this phenomenon a voltage having a polarity and an amplitude proportional to direction and speed of sidewise travel is furnished to terminal 705, as is explained below in connection with Fig. 9. This voltage is applied through resistor R-707 across a non-linear resistive circuit shown as comprising two lamps, R-708 and R-709. While this specific type of non-linear impedance has proven to be suitable, it will be understood that other types of non-linear circuits may be provided. The function of lamps R-708 and R-709 is to load down the input current through resistor R-707 so that the voltage at terminal 706 will vary approximately proportionately to the square of the voltage at terminal 705, since the weathercocking moment will vary in a typical aircraft as the square function of sidewise velocity. The voltage at terminal 706 is applied to integrator U-701 through resistors R-710, R-704 and R-705.

The three input factors commensurate with turning moments are integrated with respect to time by integrator U-701, which produces an output voltage proportional to rate of turning. A portion of this voltage is fed back via potentiometer R-712 and resistor R-713 to the input of integrator U-701 as a "drag" or damping voltage, since the drag moments resisting turning in actual aircraft are a function of the rate of turn. The output voltage from integrator U-701 is applied through resistor R-715 to integrator U-702, which integrates rate of turn with respect to time, giving heading of the simulated flight. The output of integrator U-702 is applied to a chopper and a servoamplifier to position heading servomotor M-500. The heading servoassembly may be similar to the servoassembly described in connection with Fig. 5. Potentiometer R-717 is the conventional follow-up potentiometer, and is positioned by the heading servomotor M-500. Contacts are provided across integrators U-701 and U-702 to discharge their capacitors when the trainer is "reset," as will be further explained below.

Attitude and position computations

In the actual aircraft the pilot determines the attitude and direction of flight by means of a control stick similar to stick 111 (Fig. 1). The control stick is mechanically linked to a swash plate, which varies the pitch of the main rotor blades above and below a value determined by the collective pitch control during each cycle of their rotation. Hence if the pilot moves the stick forward from a vertical position, each main rotor blade will be partially feathered and will have decreased pitch as it sweeps toward a forward sector of its circle of rotation, and conversely, it will have increased pitch as it sweeps toward the rearward, or tail sector of its rotation. Movement of the control stick sidewise will cause similar sidewise cyclic variation in pitch. Since the lift force developed by the blades is proportional to their pitch, less lift will be developed in the above example during sweep of the blades through the forward sector, and the blades will consequently cut through the air mass at a lower point. It will be apparent then, that since the rotor blades are hinged near the rotor mast the plane of rotation of the main rotor blades will be tilted forward. Since the propulsive force developed by the main rotor blades acts perpendicularly to the plane of rotation of the blades, tilting the plane of rotation forward will cause a component of force in the forward direction. The main rotor blades are hinged above the swash plate so that the plane of rotation of the blades may be tilted a considerable amount without tilting the aircraft fuselage or the mast upon which the blades are carried an equal amount, but the forward horizontal component of force at the top of the mast does pitch the fuselage about the center of gravity of the fuselage.

The actual aircraft carries a stabilizer bar which serves to prevent rapid and uncontrollable pitching or banking. The stabilizer bar comprises a long, thin rod mounted near the main rotor blades to rotate in either the same plane or a plane parallel to the main rotor blades. Attached to each end of the stabilizer bar are bob-weights which develop considerable momentum as they rotate. When the aircraft mast begins to tilt, the stabilizer bar resists the tilting due to its gyroscopic action, removing some of the added pitch which had been placed on the rotor blades by the swash plate. Thus it may be seen that the plane of rotation of the rotor blades will depend upon the combined effects of the swash plate and the stabilizer bar. Eventually, of course, the stabilizer bar will precess so as to rotate in a plane normal to the mast. In simulating the operation of the aircraft, it is convenient to consider the plane of rotation of the main rotor blades as being determined by an imaginary or "virtual" swash plate which has an effect according to the sum of the actual swash plate effect and the stabilizer bar effect.

The motion of the stabilizer bar plane in space may be expressed as:

$$\dot{\phi} + \dot{B}_S = -GB_S \qquad (1)$$

where $\dot{\phi}$=angular velocity of the aircraft mast in space in rolling direction,
$\dot{B}_S$=angular velocity of stabilizer bar plane with respect to its equilibrium plane normal to the mast
$B_S$=angle between stabilizer bar plane and a plane normal to the mast.
$G$=the stabilizer bar following rate, which is a constant for any particular aircraft.

The angle of the "virtual" swash plate may be expressed as:

$$B_v = B_p + k_{10}B_s \qquad (2)$$

where $B_v$=angle of the imaginary or virtual swash plate
$B_p$=angle of the actual swash plate from its center or "zero" position as determined by the placement of the control stick.
$k_{10}$=A constant of approximately .75, indicating that the stabilizer bar angle has only three-fourths as much effect as the actual swash plate angle in determining virtual swash plate angle.

Dividing Equation 2 by G and transposing terms:

$$B_s + \frac{1}{G}\dot{B}_s = \frac{-1}{G}\dot{\phi} \qquad (3)$$

Dividing thru Equation 3 by $B_s$, $$B_s\left(1 + \frac{1}{G}P\right) = -\frac{1}{G}\dot{\phi} \qquad (4)$$

where P is the differential operator.
Rewritten Equation 4 gives:

$$B_s = \frac{-\frac{\dot{\phi}}{G}}{1 + \frac{P}{G}} \qquad (5)$$

The motion of the rotor blade plane in space may be expressed by the following equation:

$$\dot{\gamma}_h = \dot{\phi} + \dot{\gamma} = N[B_v + \epsilon - \gamma] \qquad (6)$$

where $\dot{\phi}$=rolling velocity of aircraft mast
$\dot{\gamma}$=rolling velocity of blade plane with respect to plane normal to the mast
$N$=the rotor following rate, a constant, and equal approximately to 10 in a typical small aircraft.
$\epsilon$=the effect of "flapping" of the rotor blades due to lateral velocity, and equal to $k_2\dot{y}$ if the ratio between collective pitch and engine speed does not vary appreciably during lateral translation.

As the actual swash plate is tilted, the virtual swash plate angle $B_v$ varies as expressed by Equation 2, and the helicopter blades seek an equilibrium plane $\gamma$ at a rate expressed by Equation 6. The position of the equilibrium plane at any instant is expressed by the terms $B_v + \epsilon$. If there were no sidewise velocity of the aircraft, $\epsilon$ would be zero.

Dividing through by N in Equation 6:

$$\frac{\dot{\gamma}_h}{N} = \frac{\dot{\phi}}{N} + \frac{\dot{\gamma}}{N} = B_v + \epsilon - \gamma \qquad (7)$$

Substituting in the right hand side of Equation 7, $$\frac{\dot{\phi}}{N} + \frac{\dot{\gamma}}{N} = (B_p - k_{10}B_s) + k_2\dot{y} - \gamma$$

Transposing terms and substituting for $B_s$, $$\gamma + \frac{\dot{\gamma}}{N} = B_p - \left[\frac{\frac{k_{10}\dot{\phi}}{G}}{1 + \frac{P}{G}}\right] + k_2\dot{y} - \frac{\dot{\phi}}{N}$$

$$\gamma = \frac{1}{1 + \frac{1}{N}P}\left[B_p - \frac{\frac{k_{10}\dot{\phi}}{G}}{1 + \frac{1}{G}P} + k_2\dot{y} - \frac{\dot{\phi}}{N}\right] \qquad (8)$$

Equation 8 is continuously solved by apparatus described below to determine the plane of rotation of the aircraft rotor blades.

The rolling force imparted to the aircraft as the rotor blade rotation varies may be expressed by the equation:

$$\ddot{\phi} = \frac{Fa \sin \gamma}{I_y} - k_5\dot{\phi} \qquad (9)$$

Where F is a constant proportional to helicopter weight, $a$ is a constant proportional to the distance between the center of gravity of the aircraft and the rotor hub, $I_y$ is the inertia of the helicopter in its rolling direction, which is, of course, a constant, $k_5\dot{\phi}$ is a damping term expressing the drag resistance to rolling forces.

Since only small angles of rotor plane banking are simulated in the invention, the angle $\gamma$ may be substituted for sin $\gamma$. The terms F, $a$, and $I_y$ may be replaced by a constant $k_1$, giving:

$$\ddot{\phi} = k_1\gamma - k_5\dot{\phi} \quad (10)$$

The forces tending to translate the aircraft sidewise upon attainment of a banked condition may be expressed by the equation:

$$\ddot{y} = \frac{-F \sin(\phi+\gamma)}{m} - k_6\dot{y}/\dot{y}/ \quad (11)$$

where $\ddot{y}$ = sidewise component of thrust due to banked rotor blade plane $F$ = rotor lifting force, which may be assumed to be equal to aircraft weight with negligible error as far as translational velocity is concerned.

$k_6\dot{y}/\dot{y}/$ = the drag resistance to lateral translation $m$ = mass of the aircraft $$\ddot{y} = -g(\phi+\gamma) - k_6\dot{y}/\dot{y}/ \quad (12)$$

where $g$ is the acceleration of gravity $$\ddot{y} = -g(\phi+\gamma) - k_6\dot{y}^2 \quad (13)$$

Similar equations apply to pitching and longitudinal translational motions of the simulated aircraft.

Referring to Figure 8 there is shown the apparatus utilized in the invention for computing attitude and position according to the equations described above. Since the rolling and sidewise motion portions function identically as the pitching and longitudinal motion portions, only the former will be described in detail.

Positive and negative computing voltages are supplied to the ends of potentiometer R-121, the center tap of which is grounded. The wiper arm of potentiometer R-121 is positioned by the student's manipulation of control stick 111 as described in Figure 1, hence having a potential which is a measure of control stick deflection or actual swash plate tilt. Hence a current commensurate with the quantity $B_p$ is applied through resistor R-801 to terminal 801. A current commensurate with the quantity $$\frac{\frac{-k_{10}\dot{\phi}}{G}}{1+\frac{1}{G}P}$$

is derived as will be explained below and applied to terminal 801 through resistor R-803. A third current proportional to the term $k_2\dot{y}$ is applied to terminal 801 through R-802, and a fourth current commensurate with $$\frac{-\dot{\phi}}{N}$$

is applied through resistor R-804 to terminal 801. It will be seen that these four terms comprise the quantity within brackets in Equation 8. The currents are parallel-added through potentiometer R-805 to charge and discharge capacitor C-801. As will be apparent to those skilled in the art, the application of currents through a resistance to charge a capacitor modifies the currents by a time lag which may be expressed by the factor $$\frac{1}{1+PK}$$

where $P$ is the differential operator. Thus is may be seen that the bracketed quantity of Equation 8 is operated upon by the time lag circuit to produce a voltage commensurate with the quantity $\gamma$ as expressed in Equation 8, continuously producing at terminal 803 a voltage commensurate with rotor blade plane angle. It will be apparent to those skilled in the art that all constant multipliers may be provided for by appropriate resistor scaling.

Integrator U-801 receives inputs corresponding to the two terms in the right hand side of Equation 10, the $k_1\gamma$ term being applied through resistors R-806 and R-807, and the $k_5\dot{\phi}$ term being applied through resistor R-808. Hence integrator U-801 receives inputs commensurate with rolling forces ($\ddot{\phi}$) and produces an output at terminal 805 commensurate with rolling velocities ($\dot{\phi}$). The $\dot{\phi}$ velocity voltage at terminal 805 is applied to integrator U-802 to produce at terminal 806 a voltage commensurate with roll angle. The roll angle voltage is applied through conductor 811 and resistor R-826 to position roll or bank servomotor M-400 and to position the projection apparatus in a manner described above.

The $\dot{\phi}$ voltage at terminal 805 is applied across potentiometers R-809 and R-810. A portion of the voltage on potentiometer R-809 is applied through resistor R-804 to furnish the $$\frac{-\dot{\phi}}{N}$$

voltage to terminal 801. A portion of the $\dot{\phi}$ voltage on potentiometer R-810 is applied through the time lag circuit comprising capacitor C-802 and resistor R-803 to furnish the $$\frac{\frac{k_{10}\dot{\phi}}{G}}{1+1/GP}$$

term of Equation 8.

The angle of roll voltage $\phi$ at terminal 806 is applied via potentiometer R-811 and resistor R-812 to integrator U-803. The $\gamma$ voltage at terminal 803 is applied through resistor R-814 to integrator U-803, providing the $\phi$ and $\gamma$ term of Equation 13. Integrator U-803 solves Equation 13, feeding the drag term $k_6\dot{y}^2$ back to the input of integrator U-803 through resistor R-815. The voltage at the output of integrator U-803 is proportional to sidewise velocity ($\dot{y}$), and the squaring is accomplished by non-linear impedance R-817. The $\dot{y}$ output voltage is also applied to excite potentiometers R-819 and R-820. A selected portion of the voltage on potentiometer R-819 is applied through resistor R-802 to furnish the $k_2\dot{y}$ term of Equation 8. A portion of the ($\dot{y}$) sidewise velocity voltage across potentiometer R-820 is applied to excite the upper terminal 1 of resistance resolver R-821 and through amplifier U-809 to excite the lower terminal of the resolver. The shaft of resolver R-821 is positioned by heading servomotor M-500, the operation of which is explained in connection with Fig. 7. A voltage proportional to $\dot{y}$ sin $\psi$ appears on conductor 5 of resolver R-821, and a voltage proportional to $\dot{y}$ cos $\psi$ appears on conductor 4 of resolver R-821, where $\psi$ is the heading angle. The $\dot{y}$ sine $\psi$ represents the component of sidewise velocity in an east-west direction if heading angles are referenced to north and south. Resolver R-822, which is also positioned by heading servo M-500, performs a similar function in regard to longitudinal velocity, and produces a voltage on conductor 808 proportional to the east-west component of longitudinal velocity. Voltages commensurate with the two components of east-west velocity are thusly applied through resistors R-824 and R-825 to the input of integrator U-804. A voltage selected from potentiometers R-828 and R-829 is applied through resistor R-830 and represents the east-west component of wind velocity. The arm of potentiometer R-828 may be positioned by the instructor as will be later explained. Hence the three input voltages to integrator U-804 represent the three components of velocity of the aircraft in an east-west direction. These voltages are integrated by integrator U-804 to produce a voltage at terminal 809 commensurate with the east-west position of the aircraft with respect to an arbitrary reference point, the center of the runway or carrier deck. This voltage is applied to the lateral position or "Y" servo through a chopper, and the servomotor of the Y servo assembly hence is positioned according to the instantaneous lateral position of the aircraft on the runway or carrier deck. By positioning the arm of potentiometer R-827, the instructor selects the north-south component of wind velocity. It will be apparent that while I have shown a system whereby wind velocity is set in by components, that the same quantities may be derived by positioning of a wind amplitude potentiometer and a wind heading resolver.

Fore and aft deflection of control stick 111 positions the wiper arm of potentiometer R-116 as explained in connection with Fig. 1, and circuits identical in principle to those described above compute pitching of the rotor blade plane and of the aircraft, and longitudinal velocity and position of the simulated aircraft. The voltage at terminal 605 represents longitudinal velocity of the aircraft, and like its lateral velocity counterpart terminal 606, is connected to circuits described in Fig. 6 for computation of simulated altitude. The voltage at the output terminal of integrator U-808 represents longitudinal position (X) of the aircraft on the runway or carrier deck. This voltage is applied through summing resistor R-832 to excite follow-up potentiometer R-833. A negative direct voltage is also applied to excite potentiometer R-833 through summing resistor R-834. The voltage on the arm of potentiometer R-833 is applied through resistor R-835 to the contact of a chopper and thence to the runway end shutter servoassembly. A voltage commensurate with altitude derived as explained above in connection with Fig. 6 is applied to the chopper contact at terminal 620 and through resistor R-836. A positive direct voltage is also applied to the chopper contact through resistor R-837. The voltage applied to the chopper is utilized to position the runway end shutter servoassembly, including runway end shutter servomotor M-900 (Fig. 1). As the altitude of simulated flight increases, the runway end shutter 255 will be driven upwardly, narrowing the image of the end of the runway viewed by the student. As the distance from the simulated end of the runway decreases due to simulated translation, the runway end shutter 255 will be driven downwardly by servomotor M-900, increasing the width of the runway end image viewed by the student. As will be apparent, decreases in altitude, or translation, away from the end of the runway will have effects opposite to those set forth above.

Figure 12:
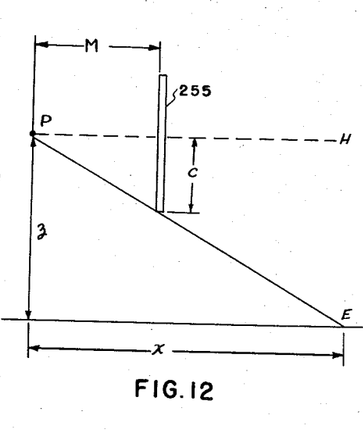
Fig. 12 is a geometric diagram helpful in understanding the runway end portion of the shutter position computer portion of the invention.

Assuming that the simulated aircraft is situated at point P as shown in Fig. 12 at a distance X from the end of a runway or carrier deck, and at an altitude $z$ above the surface, the pilot will look along line PE and see the end of the runway at point E. Since the end of the runway image in the invention is determined by the position of shutter 255, it will be apparent that shutter 255 must be raised or lowered as the distance X of simulated flight varies and as altitude $z$ of simulated flight varies.

The position C of the shutter 255 below horizon line PH will bear a relation to distance M as the distance X bears to altitude $z$, which may be expressed as:

$$\frac{C}{M}=\frac{X}{z}$$

or, $$\frac{1}{C}=\frac{z}{XM}$$

Since the distance M (distance between student and shutter 255) is a constant, it will be seen that the position of the shutter 255 must be varied according to: $z$ (altitude) divided by X (longitudinal position along runway). The runway end shutter servo will drive its follow-up potentiometer R-833 until the voltage applied to the chopper through resistor R-835 exactly cancels the voltage applied to the chopper through resistor R-836 (assuming the two constant direct voltages cancel each other), so that the X voltage multiplied by servo position (c) equals the $z$ altitude voltage, or: $cX=z$.

It will now be apparent that the servo will position itself according to the ratio of altitude to longitudinal position along the runway, and by positioning shutter 255 accordingly, the end of the simulated runway or carrier deck image is continuously created as aircraft altitude and position vary.

Figure 13:
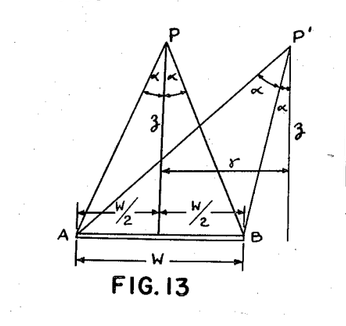
Fig. 13 is a geometric diagram helpful in understanding the runway side portion of the shutter position computer portion of my invention.

As the altitude and lateral position of the simulated aircraft vary, the perspective view of the sides of the runway seen by the student will vary also in realistic manner. If a pilot is situated at point P in Fig. 13 at an altitude $z$ exactly above the center of the runway, the sides of the runway PA and PB will appear as shown in Fig. 13. If the simulated aircraft is positioned a distance $y$ away from the center of the runway at point P¹, the sides of the runway will appear as lines P'A and P'B in Fig. 13. Since shutters 245 and 246 (Fig. 1) determine the position of the sides of the simulated runway, they must be positioned according to the factors:

$$\tan \alpha = \frac{W_2+y}{z}$$

$$\tan \alpha = \frac{y-W/2}{z}$$

Where $\alpha$ represents in each case the shutter angle with respect to vertical,
$y$ represents the lateral position of the aircraft with respect to the center of the runway,
W equals the width of the runway, and
$z$ equals simulated altitude.

Figure 9:
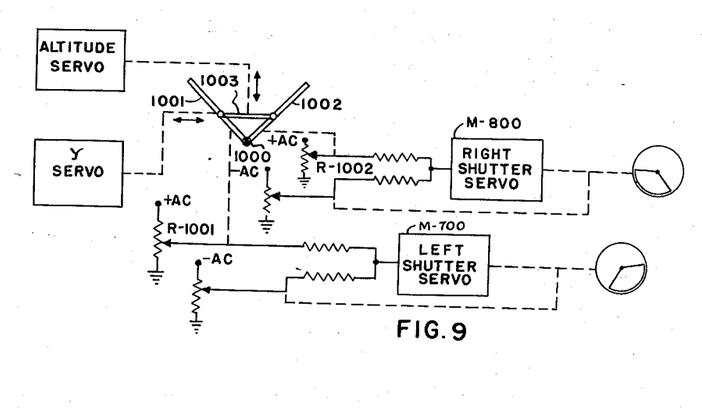
Fig. 9 is a schematic diagram showing the shutter angle computer mechanism of my invention.

The shutters may be positioned according to the above expression by the apparatus shown in Fig. 9. Journalled concentrically on shaft 1000 are two similar arms 1001 and 1002, which are joined by a rigid linkage rod 1003. The ends of linkage rod 1003 are slidably connected to arms 1002 and 1003. Rod 1003 is raised and lowered in slides (not shown) by mechanical connection to the altitude servo, drawing together or pushing apart arms 1001 and 1002, each of which pivots about shaft 1000. Rod 1003 is positioned to the right and left by the Y servo in slides (not shown), rotating arms 1001 and 1002 about shaft 1000. The rotation of arms 1001 and 1002 about shaft 1000 will vary according to the tangent functions stated above, and the rotation of arms 1001 and 1002 are used to position the arms of potentiometers R-1001 and R-1002. The voltages upon the arms of potentiometers R-1001 and R-1002 are utilized to position left and right shutter servomotors and left and right shutters 245 and 246, as described above.

The output voltage of integrator U-808 proportional to translation along the length of the runway is also applied through conductor 840 to an anode and a cathode of a dual diode vacuum tube V-3. Connected to opposite elements of each diode are relay coils K-106 and K-105, which are connected through potentiometers R-841 and R-840 to positive and negative voltages as shown in Fig. 8. During normal and skilled operation of the trainer neither relay will be energized. If, however, the student maneuvers too far forward or backward, along the length of the runway, the voltage on conductor 840 will increase sufficiently to make one of the diodes conduct, energizing its associated relay coil, actuating the relay contacts, which will energize circuits described below to indicate that over-travel along the length of the runway has occurred. It will be apparent that one diode-relay combination is provided for each direction of travel. By adjustment of potentiometers R-840 and R-841, the allowable limits of travel along the length of the runway may be adjusted. It will be apparent that the two diodes need not be disposed within a single envelope, and it will be further apparent that selenium rectifiers may be substituted for vacuum diodes.

*Relay control system*

Figure 10:
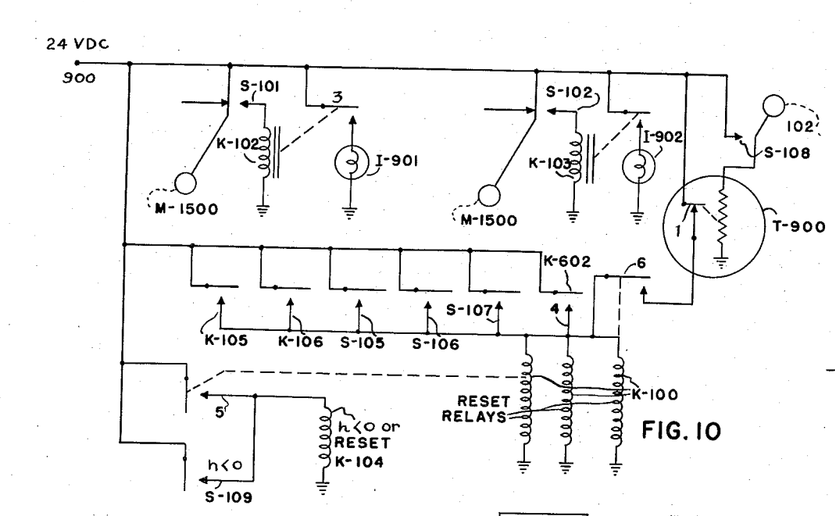
Fig. 10 is an electrical schematic diagram of the relay and control system of the invention.

Shown schematically in Fig. 10 is apparatus utilized to control the computer portions described above. A direct voltage from the power supply is furnished to terminal 900. When engine speed of the simulated aircraft engine exceeds a predetermined amount (for example, 2750 r.p.m.), a cam attached to the shaft of engine speed servomotor M-1500 will close switch S-101, energizing relay K-102, closing contact 3 and illuminating engine speed indicating lamp I-901. Further increase in simulated engine speed will close switch S-102, by means of another cam on the shaft of servomotor M-1500, energizing relay K-103 and illuminating engine speed indicator lamp I-902. The second cam may be positioned on the engine speed servo shaft to actuate switch S-102 at a position commensurate with a greater engine speed (3150 r.p.m., for example). Energization of relays K-102 and K-103 also closes contacts shown in Fig. 6 to prepare the altitude computer portion of the invention for operation.

If the student maneuvers the simulated aircraft so as to exceed the limits of travel along the length of the runway, either relay K-105 or relay K-106 will be energized as explained above (Fig. 8). Energization of one of these relays will close its associated contact shown in Fig. 10, energizing the K-100 "reset" relays. While similar apparatus may be connected to operate when allowable lateral travel across the width of the runway has been exceeded, a material savings in parts may be effected by providing simple switches, such as switches S-105 and S-106 shown in Fig. 10. Switches S-105 and S-106 may be actuated by cams attached to the Y servo (Fig. 8), or may be located adjacent linkage rod 1003 (Fig. 9) to be operated selectively according to the position of the Y servo. Switch S-107 may be actuated either by linkage rod 1003 or by mechanical connection to altitude servo-motor M-1600, to be closed whenever simulated altitude exceeds a predetermined amount, as for example, ten feet.

If a student maneuvers the simulated aircraft so as to exceed a predetermined allowable rate of descent, relay K-602 will be energized as explained above in connection with Fig. 6, closing its contact 4 (Fig. 10). It will be apparent that closure of any of switches S-105, S-106, or S-107 or of contact 4 of relay K-602 will also energize the K-100 reset relays.

Energization of the K-100 relays closes contact 6 as shown in Fig. 10, sealing in the K-100 reset relays even if the aircraft is then maneuvered so as no longer to exceed permissible travel or rate of descent. The sealing or holding circuit is made through normally-closed contact 1 of timer T-900. Energization of reset relays K-100 closes contacts which are connected across the integrating capacitors of each of the integrators described above, discharging the capacitors and returning all simulated flight potentials to zero. While I have shown three reset relays connected in parallel, it will be apparent that a lesser or greater number may be provided. Contacts actuated by one of the reset relays may be used to illuminate a floodlight upon energization of the reset circuit, or to de-energize light sources 227 and 258 (Fig. 1) upon attainment of reset conditions, to remove the simulated runway image from screen 137. In order to begin another practice flight, the student must re-position collective pitch control 102 (Fig. 1) to a feathered position, which will close switch S-108, energizing timer T-900. Approximately five seconds after timer T-900 is energized, it will open its normally-closed contact 1, interrupting the holding circuit of the K-100 reset relays and allowing normal operation of the invention.

Energization of reset relays K-100 also closes contact 5 as shown in Fig. 10, energizing relay K-104. Relay K-104 may also be energized by closure of switch S-109, an altitude switch adapted to close when simulated altitude decreases to zero or less. Altitude switch S-109 may be located adjacent the angle computer mechanism of Fig. 9 to be actuated by linkage rod 1003 upon attainment of a "less than zero" altitude condition, or it may be actuated by a cam mechanically driven by altitude servomotor M-1600. Energization of relay K-104 serves to close its contact 4 shown in Fig. 6 to prevent integration of downward forces when the simulated aircraft is grounded, as explained above.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. In a grounded aircraft trainer having a student's station, a lifting rotor pitch control and a tail rotor pitch control simulating those of an actual aircraft, means operable by said tail rotor pitch control for deriving a first potential commensurate with tail rotor pitch, means for modifying said first potential by a function of simulated tail rotor speed to produce a second potential commensurate with an aircraft turning movement, means for deriving a third potential commensurate with torque required to rotate said lifting rotor, circuit means for combining said second and third potentials to produce a fourth potential commensurate with aircraft turning forces, and integrating means responsive to said fourth potential for producing an output potential commensurate with aircraft turning velocity.

2. In a grounded aircraft trainer having a student's station and controls simulating those of an actual aircraft, means for deriving a first potential commensurate with tail rotor turning moments, means for deriving a second potential of opposite sense commensurate with lifting rotor turning moments, means for deriving a third potential as a function of lateral translation of simulated flight, and integrating means responsive to the combination of said three potentials for producing an output potential commensurate with simulated aircraft turning velocity.

3. Grounded training apparatus comprising a student's station having controls simulating those of an actual aircraft, a projection screen observable from said student's station, and projection apparatus operable to cast an image of a simulated grounded surface upon said screen, said projection apparatus comprising a light source disposed to project a pattern of light onto said screen, a plurality of shutters disposed optically between said light source and said screen with the edges of said shutters being arranged relative to each other to create and outline an aperture, means coupled to said shutters for changing the shape of the outline of said aperture formed by said edges of said shutters and also for changing the size of said aperture outlined by said edges, and means coupling said simulated aircraft controls to said means coupled to said shutters.

4. Grounded training apparatus comprising a student's station simulating an aircraft station, a projection screen observable from said student's station, and projection apparatus operable to cast an image simulating the appearance of a grounded area onto said screen, said projection apparatus comprising a light source disposed to project a pattern of light toward said screen, a plurality of shutters optically interposed between said light source and said screen, and means for changing the shape of said pattern of light on said screen comprising means for moving one of said shutters relative to another of said shutters to define an aperture whose boundary assumes a plurality of shapes in response to the motion of said shutter, said shutter moving means being responsive to simulated conditions of flight of said simulated aircraft station.

5. Grounded training apparatus comprising a student's station simulating an actual aircraft station, a projection screen observable from said student's station, and projection apparatus operable to cast an image simulating the appearance of a fixed grounded area onto said screen, said projection apparatus comprising a light source disposed to project light toward said screen, a plurality of shutters optically interposed between said light source and said screen and defining the boundaries of an aperture, and motive means responsive to altitude and position of simulated flight for moving said shutters to vary the shape and size of said aperture, said motive means being adapted to position said shutters relative to each other to define the boundary of an asymmetrically shaped aperture, whereby a similar asymmetric image is projectable on said screen, and means for projecting the mirror image of said asymmetric image onto said screen comprising means for rotating said projector in accordance with attitude of simulated flight.

6. Grounded training apparatus for simulating the operation of a helicopter aircraft or the like comprising a plurality of simulated aircraft controls including a simulated cyclic pitch control, means for deriving a first potential commensurate with displacement of said cyclic pitch control, means for deriving a second potential commensurate with simulated angular motion of said helicopter about a horizontal axis and means for applying a time lag to said potential in accordance with simulated stabilizer following rate to provide a third potential, means for deriving a fourth potential commensurate with simulated translational velocity, means for combining the aforesaid potentials and applying a time lag to the combined potentials in accordance with simulated helicopter rotor following rate to provide a resultant potential commensurate with the angle of the plane of rotation of the rotor of said simulated aircraft, and means responsive to said resultant potential to indicate the attitude of said simulated aircraft.

7. Grounded training apparatus for simulating the operation of a helicopter aircraft or the like comprising a plurality of simulated aircraft controls including a simulated cyclic pitch control, means for deriving a pair of potentials commensurate with displacement of said cyclic pitch control in two perpendicular directions, means responsive to simulated translational velocities of said aircraft for deriving potentials commensurate with simulated flapping of the rotor blades of the simulated aircraft, means responsive to simulated angular motion of said simulated aircraft about each of two simulated perpendicular horizontal axes for deriving further potentials, and means combining the aforesaid potentials to provide resultant potentials commensurate with simulated angles of the simulated plane of rotation of the simulated rotor of said simulated aircraft.

8. Apparatus according to claim 7 in which said resultant potentials are applied to a pair of integrating means to provide additional potentials commensurate with said simulated translational velocities, means for applying a function of said additional potentials to the inputs of said integrating means in degenerative sense, and means for integrating said additional potentials with respect to time to provide potentials commensurate with the position of said simulated aircraft.

9. Grounded training apparatus for simulating the operation of a helicopter aircraft or the like comprising a plurality of simulated aircraft controls, including a simulated cyclic pitch control, means for deriving a first potential commensurate with displacement of said cyclic pitch control, means for deriving further potentials commensurate with forces tending to influence the plane of rotation of a simulated lifting rotor of said simulated aircraft, an electrical circuit responsive to the aforesaid potentials to provide a resultant potential commensurate with a simulated angle of the plane of rotation of said simulated lifting rotor, and integrating means responsive to said resultant potential to provide an additional potential commensurate with simulated rate of angular motion of said simulated aircraft about a simulated horizontal axis associated with said aircraft.

10 Apparatus according to claim 9 in which one of said further potentials comprises means for deriving a second potential commensurate with simulated rate of angular motion about said simulated horizontal axis, and in which said means for deriving said second potential is responsive to said output potential from said integrator.

11. Apparatus according to claim 9 having a second integrator responsive to said additional potential to provide a third potential commensurate with angular displacement of said simulated aircraft about said axis, and means responsive to said third potential for indicating said angular displacement.

12. Apparatus according to claim 9 having second integrating means responsive to said additional potential for providing a fourth potential commensurate with angular displacement of said simulated aircraft about said axis, and further integrating means responsive to said resultant potential and said fourth potential for providing an output potential commensurate with simulated translation velocity of said simulated aircraft.

13. Apparatus according to claim 12 in which said output potential is connected degeneratively through non-linear circuit means to the input circuit of said further integrating means to simulate drag due to translational velocity of said simulated aircraft.

14. Apparatus according to claim 12 in which one of said further potentials comprises a fifth potential commensurate with flapping of the simulated rotor blades, and in which said output potential is connected to said electrical circuit to provide said fifth potential.

15. Grounded training apparatus comprising a student's station having controls simulating those of an actual aircraft, a projection screen observable from said student's station, projection apparatus operable to cast an image of a simulated grounded surface upon said screen, said projection apparatus comprising a light source disposed to project a pattern of light onto said screen, three shutters disposed optically between said light source and said screen, the edges of said shutters being arranged relative to each other to create and outline an aperture, an edge of each of two of said shutters being arranged to extend radially from a common point to form a sectoral aperture therebetween, means for moving said two shutters angularly relative to each other to vary the angle of said sectoral aperture, and means for moving the third of said shutters to cover a triangular portion of said sectoral aperture, and means responsive to simulated conditions of flight coupled to said shutter moving means for controlling said shutter moving means responsively to said simulated controls.

References Cited in the file of this patent

UNITED STATES PATENTS

| | | |
|---|---|---|
| 2,016,151 | Levene | Oct. 1, 1935 |
| 2,352,101 | Hutter | June 20, 1944 |
| 2,385,095 | McCarthy | Sept. 18, 1945 |
| 2,418,512 | Johnson | Apr. 8, 1947 |
| 2,420,316 | Hine | May 13, 1947 |
| 2,474,096 | Dehmel | June 21, 1949 |
| 2,485,292 | Kail | Oct. 18, 1949 |
| 2,485,435 | Dehmel | Oct. 18, 1949 |
| 2,502,834 | Dreyer | Apr. 4, 1950 |
| 2,510,161 | Wilkinson et al. | June 6, 1950 |
| 2,510,579 | Kail | June 6, 1950 |
| 2,584,261 | Davis et al. | Feb. 5, 1952 |
| 2,591,752 | Wicklund | Apr. 8, 1952 |
| 2,711,594 | Hickey | June 28, 1955 |
| 2,720,712 | Brettell et al. | Oct. 18, 1955 |

FOREIGN PATENTS

| | | |
|---|---|---|
| 577,566 | Great Britain | May 23, 1946 |
| 640,045 | Great Britain | July 12, 1950 |